United States Patent
Park et al.

(10) Patent No.: US 10,822,492 B2
(45) Date of Patent: Nov. 3, 2020

(54) THERMOPLASTIC RESIN COMPOSITION AND MOLDED PRODUCT CONTAINING SAME

(71) Applicant: LOTTE ADVANCED MATERIALS CO., LTD., Yeosu-si (KR)

(72) Inventors: Jeong Eun Park, Uiwang-si (KR); Hee Yun Jeong, Uiwang-si (KR); Kee Hae Kwon, Uiwang-si (KR); Chang Min Hong, Uiwang-si (KR)

(73) Assignee: Lotte Advanced Materials Co., Ltd., Yeosu-si (KR)

(*) Notice: Subject to any disclaimer, the term of this patent is extended or adjusted under 35 U.S.C. 154(b) by 111 days.

(21) Appl. No.: 16/064,133

(22) PCT Filed: Nov. 30, 2016

(86) PCT No.: PCT/KR2016/013981
§ 371 (c)(1),
(2) Date: Jun. 20, 2018

(87) PCT Pub. No.: WO2017/111337
PCT Pub. Date: Jun. 29, 2017

(65) Prior Publication Data
US 2019/0002688 A1    Jan. 3, 2019

(30) Foreign Application Priority Data
Dec. 22, 2015 (KR) .................. 10-2015-0184272

(51) Int. Cl.
| | |
|---|---|
| *C08L 69/00* | (2006.01) |
| *C08K 5/17* | (2006.01) |
| *C08L 67/02* | (2006.01) |
| *C08K 5/00* | (2006.01) |
| *C08L 33/10* | (2006.01) |
| *C08L 51/04* | (2006.01) |
| *C08L 33/06* | (2006.01) |
| *C08K 5/07* | (2006.01) |

(52) U.S. Cl.
CPC .............. *C08L 69/00* (2013.01); *C08K 5/005* (2013.01); *C08K 5/17* (2013.01); *C08L 33/10* (2013.01); *C08L 67/02* (2013.01); *C08K 5/07* (2013.01); *C08L 33/06* (2013.01); *C08L 51/04* (2013.01); *C08L 2205/03* (2013.01); *C08L 2207/04* (2013.01); *C08L 2207/53* (2013.01)

(58) Field of Classification Search
CPC .......... C08L 2205/03; C08L 2205/035; C08L 2207/53
See application file for complete search history.

(56) References Cited

U.S. PATENT DOCUMENTS

| 7,732,515 B2 | 6/2010 | Jang et al. |
| 8,044,143 B2 | 10/2011 | Park et al. |
| 2005/0113493 A1 | 5/2005 | Persigehl et al. |

FOREIGN PATENT DOCUMENTS

| KR | 10-1995-0001319 B1 | 2/1995 |
| KR | 10-2006-0120120 A | 11/2006 |
| KR | 10-0767428 A | 10/2007 |
| KR | 10-2010-0121131 A | 11/2010 |
| KR | 10-2011-0065848 A | 6/2011 |
| KR | 10-1266294 B1 | 5/2013 |
| WO | 2007/119920 A1 | 10/2007 |
| WO | 2017/111337 A1 | 6/2017 |

OTHER PUBLICATIONS

Office Action in counterpart Korean Application No. 10-2015-0184272 dated Jul. 2, 2018, pp. 1-5.
International Search Report in counterpart International Application No. PCT/KR2016/013981 dated Mar. 6, 2017, pp. 1-4.

*Primary Examiner* — Ana L. Woodward
(74) *Attorney, Agent, or Firm* — Additon, Higgins & Pendleton, P.A.

(57) ABSTRACT

The present invention relates to a thermoplastic resin composition and a molded product containing the same, the composition comprising: a base resin comprising a polycarbonate resin, a polyester resin, and a polyalkyl(meth)acrylate resin; a diene-based impact modifier; and an acrylic impact modifier.

9 Claims, No Drawings

THERMOPLASTIC RESIN COMPOSITION AND MOLDED PRODUCT CONTAINING SAME

CROSS-REFERENCE TO RELATED APPLICATIONS

This application claims priority to and the benefit of International Application No. PCT/KR2016/013981, filed Nov. 30, 2016, which published as WO 2017/111337 on Jun. 29, 2017; and Korean Patent Application No. 10-2015-0184272, filed in the Korean Intellectual Property Office on Dec. 22, 2015, the entire disclosure of each of which is incorporated herein by reference.

TECHNICAL FIELD

The present invention relates to a thermoplastic resin composition and a molded product including the same. More particularly, the present invention relates to a thermoplastic resin composition which has good properties in terms of weather resistance, impact resistance, and colorability and is eco-friendly and recyclable, and a molded product including the same.

BACKGROUND ART

Thermoplastic resin compositions are widely used as an exterior material for electric/electronic products, mobile devices, or office automation (OA) devices, an automobile housing, and the like due to good properties in terms of mechanical strength, heat resistance, and impact resistance. However, products (exterior materials, etc.) formed of thermoplastic resin compositions have difficulty in realizing high-quality appearance and high-gloss texture due to material limitations. Recently, a painting process is mainly performed with respect to products formed of thermoplastic resin compositions to impart a luxurious appearance such as a high-gloss texture to the products.

However, such a painting process involves several steps, such as base coating, top coating, middle coating, and primer coating, and has problems of high defect rate, causing increase in manufacturing costs and low recyclability of defective goods. Moreover, such a painting process requires large consumption of harmful volatile organic compounds, thereby causing environmental pollution.

In order to solve such problems, there have been developed unpainted materials that can realize high-gloss texture without any painting process. However, such unpainted materials are not satisfactory in terms of all the desired properties such as colorability, impact resistance, heat resistance, and scratch resistance.

Conventionally, sheet molding compound (SMC) materials have been generally used as automotive exterior materials such as bumpers. However, since SMC materials are not recyclable, there is increasing demand for eco-friendly recyclable materials that can replace the SMC materials.

Various studies have been made on polycarbonate/polyester alloys as eco-friendly materials capable of replacing SMC materials. An automotive exterior material is required to secure sufficiently high weather resistance and impact resistance. However, the polycarbonate/polyester alloys do not provide sufficient weather resistance and impact resistance. Accordingly, there has been proposed a method of adding a weathering stabilizer or an impact modifier to the polycarbonate/polyester alloys to improve weather resistance and/or impact resistance. However, this method has a problem in that an excess of weathering stabilizer or impact modifier can cause deterioration in colorability and products produced by injection molding can have poor appearance due to lots of gas flow marks on the surface thereof.

Therefore, there is a need for a thermoplastic resin composition which can realize good colorability and appearance while securing sufficient impact resistance and weather resistance to be used as an automobile exterior material.

The background technique of the present invention is disclosed in Korean Patent No. 10-1266294.

DISCLOSURE

Technical Problem

It is one aspect of the present invention to provide a thermoplastic resin composition which has good properties in terms of impact resistance, weather resistance, and colorability and thus can be used as automotive exterior materials and the like without any painting process.

It is another aspect of the present invention to provide a thermoplastic resin composition which exhibits good appearance characteristics.

It is a further aspect of the present invention to provide a recyclable eco-friendly thermoplastic resin composition which can replace SMC materials.

It is yet another aspect of the present invention to provide a molded product including the thermoplastic resin composition as set forth above.

Technical Solution

In accordance with one aspect of the present invention, a thermoplastic resin composition includes: a base resin including a polycarbonate resin, a polyester resin, and a polyalkyl(meth)acrylate resin; a diene-based impact modifier; and an acrylic impact modifier.

The base resin may include: about 40 wt % to about 80 wt % of the polycarbonate resin; about 10 wt % to about 50 wt % of the polyester resin; and about 1 wt % to about 10 wt % of the polyalkyl(meth)acrylate resin.

The diene-based impact modifier may be present in an amount of about 0.1 parts by weight to about 10 parts by weight relative to 100 parts by weight of the base resin.

The acrylic impact modifier may be present in an amount of about 0.1 parts by weight to about 10 parts by weight relative to 100 parts by weight of the base resin.

A weight ratio of the diene-based impact modifier to the acrylic impact modifier may range from about 1:1 to about 4:1.

The polyalkyl(meth)acrylate resin may be a poly(methyl methacrylate) resin.

The diene-based impact modifier may be a core-shell type impact modifier composed of a core formed of a rubber polymer including diene rubbers and a shell formed by grafting an alkyl (meth)acrylate polymer to the core.

The acrylic impact modifier may be a core-shell type impact modifier composed of: a core formed of a rubber polymer including acrylic rubbers and a shell formed by grafting an alkyl (meth)acrylate polymer to the core.

The thermoplastic resin composition may further include a weathering stabilizer, wherein the weathering stabilizer may be present in an amount of 1 part by weight or less relative to 100 parts by weight of the base resin. In accordance with another aspect of the present invention, a molded product includes the thermoplastic resin composition set forth above.

The molded product may have an Izod impact strength of about 65 kgf·cm/cm or higher, as measured on a ⅛" thick specimen in accordance with ASTM D256 and a color difference (DE) of about 2.0 or less, as measured before and after exposure to weathering conditions for 2,000 hours in accordance with ISO 4892-2.

Advantageous Effects

The present invention provides a thermoplastic resin composition which has good properties in terms of impact resistance, weather resistance, and colorability and thus can be used as automotive exterior materials and the like without any painting process.

In addition, the present invention provides a thermoplastic resin composition which can secure sufficient weather resistance with little or no weathering stabilizer through addition of a polyalkyl(meth)acrylate resin. Thus, an article produced through injection molding of the thermoplastic resin composition can suppress deterioration in aesthetics due to gas flow marks on a surface thereof, thereby exhibiting good appearance.

Further, the thermoplastic resin composition may be produced into an article capable of being used as automotive exterior materials through injection molding or the like and can be recycled due to thermoplasticity thereof.

BEST MODE

Hereinafter, embodiments of the present invention will be described in detail.

As a result of repeated studies for developing an unpainted high-impact material which is recyclable and can be used as automotive exterior materials, the present inventors found that the above objects can be achieved using a mixture of a polycarbonate/polyester blend resin, a polyalkyl(meth)acrylate resin, and two specific impact modifiers, and completed the present invention.

Specifically, a thermoplastic resin composition according to the present invention includes: a base resin including (A) a polycarbonate resin, (B) a polyester resin, and (C) a polyalkyl(meth)acrylate resin; (D) a diene-based impact modifier; and (E) an acrylic impact modifier.

Unless otherwise defined herein, the term "(meth)acrylic" refers to "acrylic" and/or "methacrylic". For example, "(meth)acrylate" may include "acrylate" and/or "methacrylate".

Next, details of each component of the thermoplastic resin composition according to the present invention will be described.

Base Resin (A) Polycarbonate (PC) Resin

The polycarbonate (PC) resin according to the present invention may include any typical polycarbonate (PC) resin used in thermoplastic resin compositions. For example, the polycarbonate resin may be an aromatic polycarbonate resin prepared by reacting diphenols (aromatic diol compounds) with a precursor such as phosgene, halogen formate, or carbonate diester.

Examples of the diphenols may include 4,4'-biphenol, 2,2-bis(4-hydroxyphenyl)-propane, 2,4-bis(4-hydroxyphenyl)-2-methylbutane, 1,1-bis(4-hydroxyphenyl)cyclohexane, 2,2-bis(3-methyl-4-hydroxyphenyl)propane, 2,2-bis(3,5-dimethyl-4-hydroxyphenyl)propane, 2,2-bis(3-chloro-4-hydroxyphenyl)propane, and 2,2-bis-(3,5-dichloro-4-hydroxyphenyl)propane, without being limited thereto. For example, the diphenols may be 2,2-bis-(4-hydroxyphenyl) propane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, or 1,1-bis(4-hydroxyphenyl)cyclohexane, specifically 2,2-bis-(4-hydroxyphenyl) propane, which is also referred to as bisphenol A.

The polycarbonate resin may be a branched polycarbonate resin. For example, the polycarbonate resin may be a polycarbonate resin prepared by adding a tri- or higher polyfunctional compound, for example, a tri- or higher valent phenol group-containing compound, in an amount of about 0.05 mol % to about 2 mol % based on the total number of moles of the diphenols used in polymerization.

The polycarbonate (PC) resin may be a homopolycarbonate resin, a copolycarbonate resin, or a blend thereof.

In addition, the polycarbonate (PC) resin may be partly or completely replaced by an aromatic polyester-carbonate resin obtained by polymerization in the presence of an ester precursor, for example, a bifunctional carboxylic acid.

The polycarbonate (PC) resin may have a weight average molecular weight (Mw) of about 15,000 or more, for example, about 15,000 to about 100,000, specifically about 17,000 to about 60,000, more specifically about 20,000 to about 40,000, for example, 20,000, 21,000, 22,000, 23,000, 24,000, 25,000, 26,000, 27,000, 28,000, 29,000, 30,000, 31,000, 32,000, 33,000, 34,000, 35,000, 36,000, 37,000, 38,000, 39,000, or 40,000, as measured by gel permeation chromatography (GPC) using polystyrene as a reference sample. Within this range, a molded product formed of the thermoplastic resin composition can exhibit good properties in terms of fluidity, heat resistance, and flexural modulus.

The polycarbonate (PC) resin may have a melt-flow index (MI) of about 5 g/10 min to about 40 g/10 min, for example, 5 g/10 min, 6 g/10 min, 7 g/10 min, 8 g/10 min, 9 g/10 min, 10 g/10 min, 11 g/10 min, 12 g/10 min, 13 g/10 min, 14 g/10 min, 15 g/10 min, 16 g/10 min, 17 g/10 min, 18 g/10 min, 19 g/10 min, 20 g/10 min, 21 g/10 min, 22 g/10 min, 23 g/10 min, 24 g/10 min, 25 g/10 min, 26 g/10 min, 27 g/10 min, 28 g/10 min, 29 g/10 min, 30 g/10 min, 31 g/10 min, 32 g/10 min, 33 g/10 min, 34 g/10 min, 35 g/10 rain, 36 g/10 min, 37 g/10 min, 38 g/10 min, 39 g/10 min, or 40 g/10 min, as measured at 220° C. under a load of 10 kg in accordance with ISO 1133, without being limited thereto. Alternatively, the polycarbonate resin may be a mixture of at least two polycarbonate resins having different melt flow indices.

The polycarbonate (PC) resin may be present in an amount of about 40 wt % to about 80 wt %, specifically about 45 wt % to about 75 wt %, more specifically about 45 wt % to about 70 wt %, for example, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, or 70 wt %, in the base resin. Within this range, a molded product formed of the thermoplastic resin composition can exhibit good properties in terms of fluidity and flexural modulus.

(B) Polyester Resin

The polyester resin (B) is an aromatic polyester resin and may be obtained by melt condensation polymerization of a $C_2$ to $C_{10}$ glycol and a terephthalic acid or an alkyl terephthalate ester. Here, "alkyl" refers to a $C_1$ to $C_{10}$ alkyl group.

Examples of the aromatic polyester resin may include a poly(ethylene terephthalate) resin, a poly(trimethylene terephthalate) resin, a poly(butylene terephthalate) resin, a poly(hexamethylene terephthalate) resin, a poly(cyclohexane dimethylene terephthalate) resin, and an amorphous modified polyester resin obtained by adding some other monomers in polymerization of these resins. Particularly, a poly(ethylene terephthalate) resin, a poly(trimethylene terephthalate) resin, a poly(butylene terephthalate) resin, or an amorphous poly(ethylene terephthalate) resin is preferred.

The polyester resin preferably has an intrinsic viscosity ([η]) of about 0.85 dl/g to about 1.52 dl/g, and more preferably about 1.03 dl/g to about 1.22 dl/g. For example, the polyester resin may have an intrinsic viscosity ([η]) of 1.03 dl/g, 1.04 dl/g, 1,05 dl/g, 1.06 dl/g, 1.07 dl./g, 1.08 dl/g, 1.09 dl/g, 1.10 dl/g, 1.11 dl/g, 1.12 dl/g, 1.13 dl/g, 1.14 dl/g, 1.15 dl/g, 1.16 dl/g, 1.17 dl/g, 1.18 dl/g, 1.19 dl/g, 1.20 dl/g, 1.21 dl/g, or 1.22 dl/g. Within this range, the polyester resin can provide good mechanical properties and moldability to the thermoplastic resin composition.

Specifically, the polyester resin may be a poly(butylene terephthalate). Here, the polybutylene terephthalate is a polymer obtained by condensation polymerization of 1,4- butanediol and terephthalic acid or dimethyl terephthalate, as monomers, through direct esterification or transesterification.

In order to improve impact resistance of the polyester resin, the polybutylene terephthalate may be copolymerized with poly(tetramethylene glycol) (PTMG), poly(ethylene glycol) (PEG), poly(propylene glycol) (PPG), a low molecular weight aliphatic polyester or a lower molecular weight aliphatic polyamide, or may be modified through blending with a component for improvement of impact resistance.

The polyester resin may be present in an amount of about 10 wt % to about 50 wt %, specifically about 20 wt % to about 50 wt %, more specifically about 24 wt % to about 50 wt %, for example, 24 wt %, 25 wt %, 26 wt % 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, or 50 wt %, in the base resin. Within this range, a molded product formed of the thermoplastic resin composition can exhibit good balance between heat resistance and fluidity.

(C) Polyalkyl(meth)acrylate Resin

The thermoplastic resin composition according to the present invention includes the polyalkyl(meth)acrylate resin (C). Based on studies of the present inventors, it was found that, when a mixture of the poly alkyl(meth)acrylate resin, the polycarbonate resin, and the polyester resin is used as a base resin, the thermoplastic resin composition can have improved weather resistance without deterioration in colorability.

The polyalkyl(meth)acrylate resin may be a homopolymer of an alkyl (meth)acrylate monomer, wherein the alkyl (meth)acrylate monomer may be a $C_1$ to $C_{10}$ alkyl group-containing (meth)acrylate monomer, for example, methyl (meth)acrylate, ethyl (meth)acrylate, or butyl (meth)acrylate, without being limited thereto.

Specifically, the polyalkyl(meth)acrylate resin may be a poly(methyl methacrylate) resin.

The polyalkyl(meth)acrylate resin may be present in an amount of about 1 wt % to about 10 wt %, specifically about 1 wt % to about 6 wt %, more specifically about 2 wt % to about 6 wt %, for example, 2 wt %, 3 wt %, 4 wt %, 5 wt %, or 6 wt %, in the base resin. Within this range, the thermoplastic resin composition can have improved weather resistance without deterioration in impact resistance and colorability.

(D) Diene-Based Impact Modifier

The diene-based impact modifier (D) may be a core-shell type copolymer containing a rubber polymer including diene rubbers.

The diene-based impact modifier may be prepared by forming a core of a rubber polymer through polymerization of a diene rubber monomer, followed by formation of a shell through graft polymerization of a monomer graft-polymerizable with the core.

Here, examples of the diene rubber monomer may include butadiene and isoprene. Particularly, butadiene is preferred to provide better physical properties.

Examples of the monomer graft-polymerizable with the core may include styrene, alkyl-substituted styrene, (meth) acrylonitrile (meth)acrylate, alkyl (meth)acrylate, and combinations thereof. Particularly, alkyl (meth)acrylate is preferred to provide better physical properties.

In one embodiment, the diene-based impact modifier may be a core-shell type impact modifier composed of a core formed of a rubber polymer including butadiene rubbers and a shell formed by grafting alkyl (meth)acrylate to the core. Since the alkyl (meth)acrylate forming the shell has good compatibility with the polyalkyl(meth)acrylate resin in the base resin, the diene-based impact modifier can be uniformly dispersed in the base resin.

The diene-based impact modifier may be present in an amount of about 0.1 parts by weight to about 10 parts by weight, specifically about 0.1 parts by weight to about 8 parts by weight, more specifically about 1 part by weight to about 5 parts by weight, for example, 1 part by weight, 2 parts by weight, 3 parts by weight, 4 parts by weight, or 5 parts by weight, relative to 100 parts by weight of the base resin. Within this range, a molded product formed of the thermoplastic resin composition can have good properties in terms of impact resistance, weather resistance, and colorability.

(E) Acrylic Impact Modifier

The acrylic impact modifier (E) may be a core-shell type copolymer containing a rubber polymer including acrylic rubbers.

The acrylic impact modifier may be prepared by forming a core of a rubber polymer through polymerization of an acrylic rubber monomer, followed by formation of a shell through graft polymerization of a monomer graft-polymerizable with the core.

Here, the acrylic rubber monomer may be a $C_4$ to $C_{20}$ alkyl (meth)acrylate, for example, butyl (meth)acrylate, hexyl (meth)acrylate, ethylhexyl (meth)acrylate, stearyl (meth)acrylate, or lauryl (meth)acrylate, without being limited thereto.

Examples of the monomer graft-polymerizable with the core may include styrene, alkyl-substituted styrene, (meth) acrylonitrile (meth)acrylate, alkyl (meth)acrylate, and combinations thereof. Particularly, alkyl (meth)acrylate is preferred to provide better physical properties.

In one embodiment, the acrylic impact modifier may be a core-shell type impact modifier composed of a core formed of a rubber polymer including acrylic rubbers and a shell formed by grafting alkyl (meth)acrylate to the core. Since the alkyl (meth)acrylate forming the shell has good compatibility with the polyalkyl(meth)acrylate resin in the base resin, the acrylic impact modifier can be uniformly dispersed in the base resin.

The acrylic impact modifier may be present in an amount of about 0.1 parts by weight to about 10 parts by weight, specifically about 0.1 parts by weight to about 8 parts by weight, more specifically about 1 part by weight to about 5 parts by weight, for example, 1 part by weight, 2 parts by weight, 3 parts by weight, 4 parts by weight, or 5 parts by weight, relative to 100 parts by weight of the base resin. Within this range, a molded product formed of the thermoplastic resin composition can have good properties in terms of impact resistance, weather resistance, and colorability.

When the diene-based impact modifier (D) is used in an amount larger than or equal to the amount of the acrylic impact modifier (E), the thermoplastic resin composition according to the present invention can have better physical properties. If the amount of the acrylic impact modifier exceeds the amount of the diene-based impact modifier, the thermoplastic resin composition is not suitable for use as an unpainted material due to poor colorability thereof.

Specifically, a weight ratio of the diene-based impact modifier (D) to the acrylic impact modifier (E) may range from about 1:1 to about 4:1, specifically about 1:1 to about 3:1, for example, 1:1, 2:1, or 3:1. Within this range, a molded product formed of the thermoplastic resin composition can have good properties in terms of impact resistance, weather resistance, and colorability.

(F) Weathering Stabilizer

The thermoplastic resin composition according to the present invention may further include a weathering stabilizer to further improve weather resistance. The weathering stabilizer may include any weathering stabilizer commonly used in the art. For example, the weathering stabilizer may be a benzophenone compound or an amine compound, without being limited thereto.

The weathering stabilizer may be present in an amount of about 1 part by weight or less relative to 100 parts by weight of the base resin. Within this range, the thermoplastic resin composition can have further improved physical properties. If the amount of the weathering stabilizer exceeds 1 part by weight, the thermoplastic resin composition cannot be suitable for use as an unpainted material due to poor colorability thereof.

(G) Additive

The thermoplastic resin composition according to the present invention may further include additives, as needed.

Examples of the additives may include an antimicrobial agent, a heat stabilizer, an antioxidant, a release agent, a light stabilizer, a compatibilizer, a dye, an inorganic additive, a surfactant, a coupling agent, a plasticizer, an impact modifier, an admixture, a colorant, a stabilizer, a lubricants, an antistatic agent, a pigment, a flame retardant, a colorant, a UV blocking agent, fillers, a nucleating agent, an adhesion aid, an adhesive, and combinations thereof.

Examples of the antioxidant may include phenol, phosphite, thioether and amine antioxidants, without being limited thereto.

Examples of the release agent may include fluorine-containing polymers, silicone oils, metal salts of stearic acid, metal salts of montanic acid, montanic ester wax, and polyethylene wax, without being limited thereto.

Examples of the colorant may include pigments and dyes, without being limited thereto.

Examples of the UV blocking agent may include titanium oxide and carbon black, without being limited thereto.

Examples of the fillers may include glass fiber, carbon fiber, silica, mica, alumina, clay, calcium carbonate, calcium sulfate, and glass beads. The fillers serve to improve properties of the thermoplastic resin composition, such as mechanical strength or heat resistance.

Examples of the nucleating agent may include talc and clay.

The additives may be present in a suitable amount for improvement in the aforementioned desired properties without causing deterioration in other properties of the thermoplastic resin composition. For example, the additives may be present in an amount of about 0.1 parts by weight to about 30 parts by weight, for example, 0.1 parts by weight, 0.5 parts by weight, 1 part by weight, 2 parts by weight, 3 parts by weight, 4 parts by weight, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, 15 parts by weight, 16 parts by weight, 17 parts by weight, 18 parts by weight, 19 parts by weight, 20 parts by weight, 21 parts by weight, 22 parts by weight, 23 parts by weight, 24 parts by weight, 25 parts by weight, 26 parts by weight, 27 parts by weight, 28 parts by weight, 29 parts by weight, or 30 parts by weight, relative to 100 parts by weight of the base resin.

The thermoplastic resin composition according to the present invention may be prepared by any suitable known method. For example, the aforementioned components and additives may be mixed using a Henschel mixer, a V blender, a tumbler blender, or a ribbon blender, followed by melt extrusion in a single screw extruder or a twin screw extruder, thereby preparing a thermoplastic resin in pellet form.

A molded product according to the present invention is formed of the thermoplastic resin composition set forth above. For example, the thermoplastic resin composition may be produced into a molded product by any known method such as injection molding, blow molding, extrusion, or casting.

The molded product including the thermoplastic resin composition according to the present invention has good properties in terms of impact resistance, weather resistance, and colorability.

Specifically, the molded product according to the present invention has a good Izod impact strength of about 65 kgf cm/cm or higher, as measured on a ⅛" thick specimen in accordance with ASTM D256.

In addition, the molded product according to the present invention has a color difference (DE) of about 2.0 or less, as measured before and after exposure to weathering conditions for 2,000 hours in accordance with ISO 4892-2 and thus has good weather resistance.

MODE FOR INVENTION

Next, the present invention will be described in more detail with reference to some examples. It should be understood that these examples are provided for illustration only and are not to be in any way construed as limiting the present invention.

Description of details apparent to those skilled in the art will be omitted for clarity.

EXAMPLE

Details of components used in Examples and Comparative Examples are as follows:

(A) Polycarbonate resin: SC-1080 (Samsung SDI Co., Ltd.).

(B) Polyester resin: SHINITE K011 (polybutylene terephthalate, SHINKONG Synthetic Fibers Corp., intrinsic viscosity ($[\eta]$): 1.2 dl/g).

(C) Polyalkyl(meth)acrylate resin: ALTUGLAS V040 (poly(methyl methacrylate), ARKEMA Inc.).

(D) Diene-based impact modifier: M732 (Kaneka Corporation).

(E) Acrylic impact modifier: FM40 (Kaneka Corporation).

(F) Weathering stabilizer: TINUVIN 1577 (BASF Corporation).

Example 1

100 parts by weight of a base resin obtained by mixing 58 wt % of the (A) polycarbonate resin with 40 wt % of the (B) polyester resin and 2 wt % of the (C) polyalkyl(meth)acrylate was mixed with 2 parts by weight of the diene-based impact modifier (D), 2 parts by weight of the acrylic impact modifier (E), and 1 part by weight of carbon black as a colorant imparting black color, followed by melt extrusion in a twin-screw extruder at a barrel temperature of 270° C., thereby preparing a thermoplastic resin composition in pellet form.

Example 2 and Comparative Examples 1 to 6

A thermoplastic resin composition was prepared in pellet form in the same manner as in Example 1 except that the amount of each component was changed as listed in Table 1, In Table 1, the contents of (A), (B), and (C) are expressed in % by weight based on the total weight of the base resin and the contents of (D), (E), and (F) are expressed in parts by weight relative to 100 parts by weight of the base resin.

TABLE 1

|     | Example 1 | Example 2 | Comparative Example 1 | Comparative Example 2 | Comparative Example 3 | Comparative Example 4 | Comparative Example 5 | Comparative Example 6 |
|-----|-----------|-----------|----------------------|----------------------|----------------------|----------------------|----------------------|----------------------|
| (A) | 58        | 68        | 50                   | 70                   | 58                   | 65                   | 58                   | 68                   |
| (9) | 40        | 30        | 40                   | 30                   | 40                   | 35                   | 40                   | 30                   |
| (C) | 2         | 2         | 10                   | —                    | 2                    | —                    | 2                    | 2                    |
| (D) | 2         | 3         | 4                    | 3                    | —                    | 4                    | —                    | 4                    |
| (E) | 2         | 1         | —                    | 1                    | 6                    | —                    | —                    | —                    |
| (F) | —         | —         | —                    | 1.5                  | —                    | —                    | —                    | —                    |

A specimen prepared using each of the thermoplastic resin compositions of Examples and Comparative Examples was evaluated as to the following properties. Results are shown in Table 2.

Property Evaluation

Preparation of specimen: each of the thermoplastic resin compositions prepared in pellet form was dried in an oven at 100° C. for 3 hours or more, followed by injection molding using a 10 oz injection molding machine at a molding temperature of 250° C. to 270° C. and a mold temperature of 60° C. to 80° C., thereby preparing a specimen for property evaluation, which met property measurement standards.

(1) Impact resistance: Notched Izod impact strength (unit: kgf·cm/cm) was measured on a 1/8" thick notched specimen in accordance with ASTM D256.

(2) Appearance: A test specimen having a size of 2 mm×50 mm×200 mm was prepared through injection molding in a mold having a pin-point gate structure, followed by evaluation according to the flowing criteria subsequent to observing the appearance of the test specimen with the naked eye.

◯: Neither flow marks, delaminations, nor blisters were observed.

×: Flow marks, delaminations, or blisters were observed.

(3) Colorability: A CIE L* value was measured using a CM-3600d instrument (Konica Minolta Co., Ltd.) in accordance with ASTM D2244, thereby performing evaluation of colorability at a brightness level. For black color, a lower L* value indicates lower brightness and thus better colorability.

(4) Weather resistance: Color difference (DE) before and after exposure to weathering conditions for 2,000 hours was measured in accordance with ISO 4892-2.

TABLE 2

|                    | Example 1 | Example 2 | Comp. Example 1 | Comp. Example 2 | Comp. Example 3 | Comp. Example 4 | Comp. Example 5 | Comp. Example 6 |
|--------------------|-----------|-----------|-----------------|-----------------|-----------------|-----------------|-----------------|-----------------|
| (1) Impact resistance | 70        | 68        | 40              | 65              | 75              | 75              | 6               | 68              |
| (2) Appearance     | ◯         | ◯         | x               | x               | ◯               | ◯               | ◯               | ◯               |
| (3) Colorability   | 28.30     | 27.91     | 27.51           | 28.00           | 29.26           | 27.87           | 26.00           | 27.91           |
| (4) Weather resistance | 1.8   | 1.7       | 1.8             | 1.9             | 2.2             | 8.2             | 1.8             | 10.5            |

As shown in Table 2, the thermoplastic resin compositions according to present invention (Examples 1 and 2) exhibited good properties in terms of impact resistance, appearance, colorability, and weather resistance. Conversely, the thermoplastic resin compositions free from the polyalkyl(meth) acrylate resin (Comparative Examples 2, 3, and 4) exhibited poor properties in terms of appearance or weather resistance, the thermoplastic resin compositions including only one of the diene-based impact modifier and the acrylic impact modifier (Comparative Examples 1, 3, and 6) exhibited poor properties in terms of at least one of impact resistance, appearance, colorability, and weather resistance. In addition, the thermoplastic resin composition free from the impact modifiers (Comparative Example 5) exhibited very poor impact resistance.

Although the present invention has been described with reference to sonic embodiments, it should be understood that the present invention can be realized in various ways and that various modifications, changes, alterations, and equivalent embodiments can be made by those skilled in the art without departing from the spirit and scope of the invention. Therefore, it should be understood that the foregoing embodiments are provided for illustration only and are not to be construed in any way as limiting the invention.

The invention claimed is:

1. A thermoplastic resin composition comprising:
   a base resin comprising 40 wt % to 80 wt % of a polycarbonate resin, 10 wt % to 50 wt % of a polyester resin, and 1 wt % to 10 wt % of a polyalkyl(meth) acrylate resin consisting of alkyl (meth)acrylate monomers;
   a diene-based impact modifier, wherein the diene-based impact modifier is a core-shell type impact modifier composed of a core formed of a rubber polymer comprising diene rubber and a shell formed by grafting an alkyl (meth)acrylate polymer to the core; and
   an acrylic impact modifier, wherein the acrylic impact modifier is a core-shell type impact modifier composed of a core formed of a rubber polymer comprising acrylic rubber and a shell formed by grafting an alkyl (meth)acrylate polymer to the core,
   wherein a molded product formed of the thermoplastic resin composition has an Izod impact strength of about 65 kgf·cm/cm or higher, as measured on a 1/8" thick specimen in accordance with ASTM D256 and a color difference (DE) of about 2.0 or less, as measured before and after exposure to weathering conditions for 2,000 hours in accordance with ISO 4892-2.

2. The thermoplastic resin composition according to claim 1, wherein the diene-based impact modifier is present in an amount of 0.1 parts by weight to 10 parts by weight relative to 100 parts by weight of the base resin.

3. The thermoplastic resin composition according to claim 1, wherein the acrylic impact modifier is present in an amount of 0.1 parts by weight to 10 parts by weight relative to 100 parts by weight of the base resin.

4. The thermoplastic resin composition according to claim 1, wherein a weight ratio of the diene-based impact modifier to the acrylic impact modifier ranges from 1:1 to 4:1.

5. The thermoplastic resin composition according to claim 1, further comprising:
a weathering stabilizer.

6. The thermoplastic resin composition according to claim 5, wherein the weathering stabilizer is present in an amount of 1 part by weight or less relative to 100 parts by weight of the base resin.

7. A molded product comprising the thermoplastic resin composition according to claim 1.

8. A thermoplastic resin composition comprising:
100 parts by weight of a base resin comprising 40 wt % to 80 wt % of a polycarbonate resin, 10 wt % to 50 wt % of a polyester resin, and 1 wt % to 10 wt % of a polyalkyl(meth)acrylate resin consisting of alkyl (meth)acrylate monomers;
0.1 parts by weight to 10 parts by weight of a core-shell diene-based impact modifier relative to 100 parts by weight of the base resin, wherein the core-shell diene-based impact modifier is composed of a core comprising a butadiene rubber polymer and a shell formed by grafting monomers consisting of alkyl (meth)acrylate monomers to the core; and
0.1 parts by weight to 10 parts by weight of a core-shell acrylic impact modifier relative to 100 parts by weight of the base resin, wherein the core-shell acrylic impact modifier is composed of a core comprising an acrylic rubber and a shell formed by grafting an alkyl (meth) acrylate polymer to the core,
wherein a molded product formed of the thermoplastic resin composition has an Izod impact strength of about 65 kgf·cm/cm or higher, as measured on a ⅛" thick specimen in accordance with ASTM D256 and a color difference (DE) of about 2.0 or less, as measured before and after exposure to weathering conditions for 2,000 hours in accordance with ISO 4892-2.

9. The thermoplastic resin composition according to claim 8, comprising:
100 parts by weight of the base resin, wherein the base resin comprises 45 wt % to 70 wt % of the polycarbonate resin; 20 wt % to 50 wt % of the polyester resin; and 1 wt % to 6 wt % of the polyalkyl(meth)acrylate resin;
1 parts by weight to 5 parts by weight of the core-shell diene-based impact modifier relative to 100 parts by weight of the base resin; and
1 parts by weight to 5 parts by weight of the core-shell acrylic impact modifier relative to 100 parts by weight of the base resin.

* * * * *